United States Patent [19]

Groth et al.

[11] 4,148,864
[45] Apr. 10, 1979

[54] SILICA GEL OF IMPROVED PROPERTIES AND PROCESS OF MAKING SAME

[75] Inventors: Wilhelm Groth, Bonn; Peter Hussmann, Munich, both of Fed. Rep. of Germany

[73] Assignee: Mittex Aktiengesellschaft, Vaduz, Liechtenstein

[21] Appl. No.: 747,474

[22] Filed: Dec. 6, 1976

[30] Foreign Application Priority Data

May 5, 1976 [DE] Fed. Rep. of Germany ....... 2624392
Jun. 4, 1976 [IT] Italy .................................. 9474 A/76

[51] Int. Cl.$^2$ ............................................ C01B 33/12
[52] U.S. Cl. .................................... 423/335; 55/387; 55/487; 422/189; 422/193; 423/338
[58] Field of Search ................. 423/338, 339, 335

[56] References Cited

U.S. PATENT DOCUMENTS

| | | | |
|---|---|---|---|
| 2,047,614 | 7/1936 | Cavezzale et al. | 423/332 |
| 2,483,868 | 10/1949 | Archer et al. | 423/338 |
| 3,321,276 | 5/1967 | Burzynski et al. | 423/338 |
| 3,501,269 | 3/1970 | Winyall et al. | 423/338 |
| 3,652,216 | 3/1972 | Krekeler et al. | 423/338 |
| 3,794,712 | 2/1974 | Aboutboul et al. | 423/338 |
| 3,846,537 | 11/1974 | Marotta | 423/338 |
| 3,872,217 | 3/1975 | Merz et al. | 423/338 |
| 3,975,293 | 8/1976 | LePage | 423/338 |

FOREIGN PATENT DOCUMENTS 3927314 11/1964 Japan ........................................ 423/334

*Primary Examiner*—O. R. Vertiz
*Assistant Examiner*—Wayne A. Langel
*Attorney, Agent, or Firm*—Schwartz, Jeffery, Schwaab, Mack, Blumenthal & Kock

[57] ABSTRACT

A silica gel of improved hardness and abrasion resistance, increased adsorption power, and other valuable properties is produced by a highly economic process. A useful manufacturing system for making such silica gel and a simple apparatus for producing silica gel spheres of considerably larger diameter than heretofore known are provided.

51 Claims, 4 Drawing Figures

SILICA GEL OF IMPROVED PROPERTIES AND PROCESS OF MAKING SAME

BACKGROUND OF THE INVENTION

(1) Field of the Invention

The present invention relates to silica gel and more particularly to a silica gel of improved hardness and abrasion resistance as well as of an increased adsorption power and other valuable properties, to a highly economic process of making such a silica gel, to an apparatus and manufacturing system for making such a silica gel, and to advantageous methods of using same.

(2) Description of the Prior Art

It is known to produce silica gel by precipitation of silicic acid containing starting materials such as waterglass and an acid, usually hydrochloric acid or sulfuric acid, whereby as an intermediate product an unstable silicic acid containing sol is obtained. Said sol is subsequently caused to gel. The salts present therein are removed from said gel by washing, and the gel is finally dried.

Heretofore, waterglass solutions of a silicon dioxide content between about 13% and about 15% were used as starting materials. Solutions of such silicon dioxide concentration yield silicic acid containing sols with about 10% of silicon dioxide. However, it was not possible to use waterglass solutions of a higher concentration in technical operation because in this case undesired precipitation of silicic acid or even premature gelling takes place at higher concentrations. As a result thereof, the manufacturing process would have to be interrupted or even discontinued and the silica gel produced would be of inferior quality due to the presence of the precipitated silicic acid flakes. The use of waterglass of a higher concentration, however, would be desirable because in this case the expenses and costs for evaporating the water as well as considerable energy expenditure would be saved and thus the manufacturing process would be more economical.

Silica gels produced according to known processes furthermore, do not have the hardness required for prolonged use in manufacturng process and the necessary abrasion resistance. They have also only a limited adsorption potential.

SUMMARY OF THE INVENTION

It is one object of the present invention to provide a process of producing silica gel which process is more economical than the known processes and which allows, at the same time, the production of silica gel with novel and highly valuable properties so that it can be used in an improved manner and also for novel applications.

Another object of the present invention is to provide a silica gel of improved hardness and abrasion resistance, of a high adsorption potential, and of other valuable properties.

A further object of the present invention is to provide an apparatus and manufacturing system permitting the economic production of such an improved silica gel.

Still another object of the present invention is to provide novel and highly advantageous methods of using such an improved silica gel.

Other objects of the present invention and advantageous features thereof will become apparent as the description proceeds.

The process of the present invention avoids precipitation of silicic acid on neutralization, also usually called precipitation of waterglass by introducing, preferably by injection, a waterglass solution of a higher silicon dioxide content than heretofore used, into the precipitation and gelling vessel at such a high discharge velocity and in such a fine distribution and by stirring the mixture of waterglass and precipitating acid so vigorously by means of one or more highly effective stirrers in the precipitating container that reaction of the waterglass solution or other starting material with an acid of about 20% acid content, for instance, hydrochloric acid or sulfuric acid, proceeds within seconds or even within fractions of seconds, so that the alkaline component of the waterglass solution is at no time present in excess in the reaction mixture. That the alkaline component of the waterglass does not become preponderant can be avoided until a pH-value of the mixture of 1.8 is attained.

The process according to the present invention permits to use as starting reactant waterglass solutions containing between about 20% and about 32% of silicon dioxide. Such starting solutions yield sols which contain about 14% to about 18% of silicon dioxide. Thus, due to the use of more concentrated waterglass solutions than heretofore employed, savings of 40% to 80% of the costs required for evaporating the water and of the energy needed are made possible. Likewise and at the same time, there is obtained a noteworthy improvement in the extent to which the manufacturing plant can be utilized. The production costs including wages are also considerably reduced.

As a result of using waterglass of increased silicon dioxide content in the manufacturing process and of the additional novel process steps described hereinafter more in detail, there are produced not only silica gel types of a greater hardness and abrasion resistance as well as of a considerably increased adsorption potential, but also silica gel types operating at differing adsorption and desorption temperatures. Such silica gels possess also optimum activity at different temperatures and, due thereto, render possible novel ways of using the gels.

The invention is also concerned with a process for producing silica gel from silicic acid containing starting materials and an acid by precipitation whereby, as an intermediate product, an unstable silicic acid containing sol is formed, followed by gelling, removing the salts by washing, and drying of the gel.

According to an advantageous embodiment of the present invention the precipitation or reaction of the alkaline component of the waterglass with the acid is carried out in two steps in such a manner that at least in the first step the starting solution with a silicon dioxide content between about 20% and about 32% is introduced into the acid contained in the reaction vessel until a pH-value of said acid between about 1.5 and about 1.8 is attained. The starting solution is introduced into the acid reactant in such a fine distribution, for instance, by injecting it into the reaction vessel through nozzles provided at the bottom of the precipitation vessel, under a high pressure and at a correspondingly high discharge velocity, while the acid solution is continuously and very vigorously stirred, so that the reaction between the acid reactant and the silicon dioxide containing reactant takes place instantaneously without precipitation of silicic acid flakes.

In the second reaction step the silicon dioxide content of the starting material is reduced to a value between about 8% and about 14%. Such a reactant solution of lower concentration is introduced into the acid reactant until a pH-value between about 2.6 and about 3.5 is attained. Thereupon, the resulting sol of a silicon dioxide content of 14% to 18% is transferred into a gelling vessel which can also be used for washing and drying. Removing the salts formed during reaction with the acid by washing before drying the gel is carried out with a washing liquid having a pH-value between about 1.8 and about 12.0. When starting with a waterglass solution containing up to 32% of silicon dioxide, it is possible to dilute the 95% sulfuric acid used as acid agent to a sulfuric acid content between about 10% and about 12%. However, when starting with a waterglass solution containing about 20% of silicon dioxide, the sulfuric acid must be diluted only to about 20% to 30% in order to produce sols of the high concentration of up to 18% of silicon dioxide.

It is known to vary the pH-value of the washing liquid in order to produce gels of different properties. The present invention permits the use of washing liquids of much more graduated pH-values. Thus, for instance, silica gels of the properties given in the following Table can be obtained:

| Type of Gel | Wash Liquid pH | Pore Diameter (Angstroem) | Wetting Heat (cal./g.) |
| --- | --- | --- | --- |
| EE | 1.8–2.5 | 20–25 | 32–35 |
| E | 2.5–3.5 | 25–30 | 26–30 |
| M | 5.0–6.0 | 30–40 | 18–22 |
| W | 7.0–8.0 | 40–50 | 15–18 |
| WW | 8.0–10.0 | 50–60 | 12–15 |
| WWX | 10.0–12.0 | 60–70 | 10–12 |
| Type of Gel | Bulk Weight (g./cubic cm.) | Adsorption Temperature (° C.) | Desorption Temperature (° C.) |
| EE | 720–770 | up to 100 | 150–200 |
| E | 680–720 | up to 80 | 120–150 |
| M | 560–680 | up to 60 | 80–100 |
| W | 460–520 | up to 40 | 50–70 |
| WW | 300–460 | up to 30 | 40–60 |
| WWX | 250–350 | up to 20 | 30–50 |

The abbreviations given in said Table designate gels of the following pore diameter:
EE=Gel of the smallest pore diameter;
E=Gel of small pore diameter;
M=Gel of a pore diameter of medium size;
W=Gel of a pore diameter of large size;
WW=Gel of a pore diameter of still larger size;
WWX=Gel of a pore diameter of extremely large size.

According to another embodiment of the present invention the properties of the silica gel can be further improved by using, for precipitation by reaction with the acid reactant, a starting waterglass solution of a molar proportion of sodium oxide to silicon dioxide between about 1.0:3.5 and about 1.0:5.0. In contrast thereto, the molar proportion of commercial waterglass solutions is at the most 1.0:3.33 and usually only 1.0:2.1 and even lower. Thus it was necessary to find a new way for producing a waterglass of the desired molar proportion.

Such a waterglass is produced according to another embodiment of the present invention by reacting quartz sand with an at least 50% sodium hydroxide solution at a temperature between about 130° C. and about 180° C. and under a pressure between about 4.0 atmospheres gauge and about 12.0 atmospheres gauge. The proportion of the mixture of sand and sodium hydroxide solution is selected so that a waterglass solution containing sodium oxide and silicon dioxide in a proportion between about 1.0:3.5 and about 1.0:5.0 is obtained.

In this manner it is possible to obtain the waterglass solution without first preparing waterglass in pieces as heretofore required. As stated above, this is achieved by directly reacting quartz in the form of pure white sand with sodium hydroxide solution to yield sodium silicate of the formula $Na_2SiO_3$. The reaction is carried out in a rotating autoclave of an highly alkali-resistant chromium-nickel-steel alloy provided with an inner shovel agitating system. In contrast to the heretofore employed preparation of dissolving lumps of waterglass with steam, the autoclave must be heated from the outside so that the initial concentration of the sodium hydroxide solution remains constant during the entire process of dissolving the sand.

Of prime importance is the proportion in which sand or quartz and the sodium hydroxide solution are mixed and more particularly the concentration of the sodium hydroxide solution. It is essential that two parts of a 50% to 60% sodium hydroxide solution are employed for four parts of sand in order to achieve, for instance, a molar proportion of sodium oxide to silicon dioxide between about 1.0:3.8 and about 1.0:4.0. The temperature during dissolving the quartz or sand must be between about 130° C. and about 180° C. and the pressure between about 4.0 atmospheres gauge and about 12.0 atmospheres gauge. The reaction duration is between about 2 hours and about 4 hours.

When dissolving the sand in this manner, a semi-solid or semi-fluid product is obtained. Said product is adjusted to the concentration required for precipitation by diluting the pasty reaction mixture with water or preferably with the decantation or filtration solutions obtained from the sludge remaining after settling and clearing the waterglass solution discharged from the autoclave. Thereby it was found that small amounts of aluminum compounds and/or magnesium compounds remaining the waterglass yield gels of highly advantageous variations in quality.

The above described process of producing such a waterglass solution of the given molar proportion according to the present invention thus avoids the heretofore employed glass melting process which consumes large amounts of heat and energy and requires subsequent solution of the pieces of solid waterglass. Thus almost 70% of heat and kinetic energy and more than 50% of the proportional investment costs and other production expenses are saved. The savings amount to about 4 cents for each kilogram of silica gel or to about 80,000 Dollar for a production of 2000 tons per year of silica gel.

In order to avoid any precipitation of silicic acid and to produce a gel of a firmer structure which permits a more prolonged use, it is possible to carry out, according to another embodiment of the present invention, the second precipitation or neutralization step only up to a pH-value of about 3.0 and to reduce in a third step the silicon dioxide content of the starting reactant to a value between about 5% and about 8% in discontinuous operation until a required pH-value, for instance, of 3.2 is attained. The starting waterglass solution can be added in the second and third steps at a lower rate of throughput by means of the same nozzles or even by means of nozzles of a narrower cross-section.

Cooling of the acid reactant in the precipitation vessel to a temperature below 20° C. as it is required on discontinuous operation in order to avoid premature onset of gel formation and due thereto solidification, can be effected preferably by causing the contents of the vessel to circulate by pumping via a cooler. The process according to the present invention renders it possible to achieve precipitation, i.e. sol formation, within about 20 minutes to about 40 minutes in contrast to a considerably more prolonged reaction time when preceeding according to the known processes. Cooling of the precipitation vessel content is not necessary when continuously carrying out the precipitation steps. Thus precipitation can be substantially accelerated when carrying it out according to another embodiment of the present invention in continuous operation in troughs which are arranged one after the other. In this case the mixture of acid and silicon dioxide containing reactant remains in the first trough where the first precipitation step is carried out for not more than 1 minute to 3 minutes and in the second step in the second trough for not more than two minutes.

The gelling time can also be considerably shortened according to the present invention by combining the gelling process with a preliminary drying step, for instance, by continuously passing the sol in a thin layer, for instance, through a conveyer drying machine, preferably through a multi-conveyer drying machine.

As a means for carrying out the new process according to the present invention, there is employed a plant in which a vessel provided with an intermediate bottom having a valve which vessel is subdivided by said intermediate bottom into two container compartments and is arranged subsequent to the precipitation vessel. Said subdivided container can be a round container of chromium-nickel-steel or a suitable plastic material such as polyester material. Its upper curved part is provided with a centered opening of a diameter, for instance, of 200 mm. to 500 mm. This opening is operated similar to a valve closure by means of a conical tube which is covered all around with a rubber and supporting seal pressed thereon. The conical tube serves at the same time as bottom valve of the intermediate bottom because it extends into its central opening. By lifting up the tube, the opening in the intermediate bottom is set free and the gel can be transferred into the lower container compartment. The containers may be of a diameter of 1 m. to 5 m.

Simultaneous drying in the lower compartment of the container provided with an intermediate bottom facilitates temperature permeation in the gelling step as well as in the washing step. Furthermore, washing can be effected at a height of the gel layer of 500 mm. to 1500 mm. in arranging several containers placed one after the other so that it is possible to recover sodium sulfate or sodium chloride.

When producing the silica gel in continuous operation, the precipitation vessel can be constructed according to a preferred embodiment of the present invention as a two-step trough. A specially constructed conveyer drying machine, preferably a multi-conveyer dryer, can serve as gelling container. Said conveyer dryer is made of chromium-nickel-steel. The conveyer belts are provided with side walls and transversely arranged ribs, preferably of plastic material. The sol is placed into the spaces between the ribs and is held therein by said ribs.

A container similar to that described hereinabove with respect to the discontinuous process which is provided with a bottom valve in an intermediate bottom and is subdivided into two container compartments by said intermediate bottom can be arranged subsequently to the conveyer dryer. Said two-part container is constructed as washing container in its upper part and as dryer in its lower part. It is also possible to carry out washing and drying in the same container.

The continuous process is preferably carried out in the following manner:

A shaft having attached thereto an intensively acting agitator is mounted in a preferably closed trough or a trough which is open on top but constructed so that splashing is prevented. Said trough consists of a corrosion resistant material, preferably of a polyester material, and has a diameter of 300 mm. to 500 mm. and a length of 3 m to 6 m. Said trough is slightly inclined. The acid of the concentration required for precipitation is continuously supplied to the upper end of said trough by means of a dosing pump, after initially an acid charge of low concentration has been placed therein. At the same time there is injected through nozzles arranged at the bottom of the trough a highly concentrated waterglass solution, also by means of a dosing pump. The concentration of said waterglass solution is selected so that a high concentration of silicon dioxide in the gel of, for instance, 24% is achieved. The sol must not remain in the trough for more than 20 seconds to 180 seconds. Thus the reaction time is also between 20 seconds and 180 seconds.

The pH-value attained on precipitation, i.e. neutralization to form the sol must not exceed a pH of about 1.8 to about 2.0. Preferably precipitation is effected at a pH between about 1.2 and about 1.5. The sol mixture which is heated by the reaction heat caused by the precipitation, i.e. neutralization reaction, flow continuously at the lower end of the trough into a second smaller reaction trough which is also inclined. A less concentrated waterglass solution containing about 8% to about 10% of solution dioxide is injected into said second reaction trough by means of nozzles which are also arranged at the bottom, under a very high pressure, preferably from an autoclave wherein it is under 30 atmospheres gauge by means of compressed air or of a high pressure pump. Injection of said waterglass solution of a lower concentration is continued until the desired pH-value, for instance, between about 2.8 and about 3.0 is attained. The reaction in the second trough must proceed in such a manner that the reaction duration does not exceed 1 minute to 2 minutes, because a few minutes thereafter the sol discharged at a considerably higher temperature from the second trough starts to gel.

Gelling which is also effected continuously, takes place preferably in a multi-conveyer drying apparatus. The lateral walls and the transversely arranged upwardly directed ribs may be of a height of 50 mm. to 100 mm. and consist preferably of elastic polyurethane or silicone rubber. On returning the conveyer belts over guide pulleys of a diameter of, for instance, 300 mm., these ribs are also deflected and bent so that the solidified gel drops automatically upon the next belt or from the last belt upon a conveyer belt or a chute which conduct the gel into the subsequent washing container.

Dilute hydrochloric acid or sulfuric acid is used as washing liquid. In order to produce a pore structure with small pores, it is advisable to carry out the precipitation already with waterglass or the like reactant of a molar proportion of sodium oxide $Na_2O$ to silicon dioxide $SiO_2$ between about 1.0:3.5 and about 1.5:5.0. This proportion differs considerably from the heretofore used proportion of, at the most 1.0:1.33. Due thereto, less salt is contained in the gel from the beginning on, so that a gel with small pores of a high hardness is obtained. In order to produce gels with larger pores, it is advisable to add salts already during precipitation, for instance, salts as they are obtained on subsequent washing or during syneresis such as, for instance, sodium sulfate. When producing gels with small pores, the temperature of the washing liquid can be increased during the last phase of the washing step to a temperature of about 60° C. It is also possible to increase the pH-value of the washing liquid from a pH between about 1.8 to about 2.5 as it should normally be used, to a pH of about 5.0 to about 7.0 but only for a short period of time. For producing gels with large pores, the temperature of the washing liquid can be increased step by step up to about 90° C.

Drying after washing is preferably carried out in the same container in order to avoid any change in the structure of the resulting gelatinous gel. Preferably drying is achieved in a first drying step whereby drying is effected by circulating air of a temperature of about 80° C. and at a relative humidity of about 70% to about 80% while in the second drying step the drying temperature is between about 120° C. and about 140° C. The different adsorption temperatures of the new gels render such gels especially useful for drying gases. In accordance with a special embodiment of the present invention several layers of gels of different pore diameter are arranged one after the other in the stream of gas to be dried in such a manner that the optimum adsorption temperatures of the successively arranged gels have increasing values while the optimum regeneration temperatures have decreasing values. In order to regenerate the gels, the gas is conducted in reverse direction as compared with the gas drying step, through the layers of gels.

By using the various gels in several subsequently arranged layers whereby the gels have the adsorption temperature values as given in the Table hereinabove, the result is achieved that the gas can be dried at optimum activity of the gels for a considerably more prolonged period of time than heretofore possible, because the temperature of the gas to be dried increases from passing through one gel layer to the next layer. Conversely the temperature of the regenerating gas which is passed in reverse direction through the gel layers, decreases accordingly. Thus the heat expenditure required for regeneration is considerably reduced. In fact the savings in heat and energy expenditures amount to up to 50% of the heat and energy required heretofore for regeneration. Only 750 kcal. to 800 kcal. are required according to the present invention for the desorption process in contrast to about 1500 kcal. as needed when proceeding with silica gel as available heretofore. Thus a similar effect is achieved in this gas drying process as in the multiple-effect evaporation process.

The present invention is also concerned with new silica gel types of different pore diameter and of different adsorption power with gel types have a greater hardness, abrasion resistance, and resistance to wear and tear than the known gels.

Although it is known that not only the pore diameter of the gels, but also their other properties are dependent to a large extent upon the pH-value of the washing liquid, the variations of said values according to the present invention are not alone responsible for the surprisingly better silica gels obtained when proceeding as described hereinabove. A considerable number of novel process steps and procedures such as the precipitation at a high concentration, the changes in the molar proportions, the accelerated gelling step in combination with the preliminary drying step, and the specific manner in which the drying process is carried out, namely in layer heights of 500 mm. to 1500 mm. is also responsible for producing the superior silica gel types of the present invention. With respect to the drying process, it is of importance in order to achieve satisfactory drying that in the first drying step the humidity of the air is adjusted to a high degree of saturation. All these closely cooperating and interplaying features and procedures are of importance not only with respect to shaped gels but also to amorphous gels.

Hence, first an unstable silicic acid containing sol of a silicon dioxide content of 14% to 18% is formed according to the novel process. The subsequently resulting gel is converted by a continuous or discontinuous rapid gelling process, depending upon the manner in which said gelling is carried out, namely either on conveyer belts or in round containers, into a gel containing between about 16% to 24% of silicon dioxide. Under these conditions not only syneresis takes place but also preliminary drying in which at this point does not cause any disadvantages due to the higher salt content of the gel so that the danger of cracking or decrepitation of the gel particles is eliminated. This danger is rarely encountered since the change in molecular weight in favor of the higher silicon dioxide content prevents decrepitation of the gel anyway. A multiple conveyer drying apparatus has been found the preferred means of the continuous or discontinuous accelerated gelling process. The conveyer belts of said dryer consisting of chromium-nickel-steel or of normal steel covered with rubber on both sides are provided with side walls which are firmly connected with the conveyer belts but are elastic and consist preferably of silicone rubber, elastic polyurethane, or the like plastic. The preferred height of said side walls is between 5 cm. and 8 cm. In order to achieve at the same time molding and shaping of the gel in transverse direction advantageously a system of firmly attached, i.e. pasted on silicone rubber, polyester, polyurethane, or the like strips of a height which is a few mm. lower than that of the side walls, are inserted so that uniform distribution of the sol solution is assured when charging the troughs therewith. The above mentioned transverse strips guarantee vertical shaping of strands which are not only of the same layer thickness but also of the same width, whereby the strand may have any desired thickness. Rounded lower corners produce an even smoother shape and surface.

On sliding around the guide pulleys, the strands of gel which have shrunk already by 10% to 20% depending upon the degree of preliminary drying, drop upon a chute and into a trough with or without water or they are directly discharged and transported by conveyer belts to the washing and drying battery. In order to avoid formation of any non-uniform pieces and parts of said strands, additional transverse ribs can be provided in the troughs so as to permit molding and shaping of gel pieces of different shapes.

An essential further embodiment of the present invention for producing hemispherical bodies of the gel or bodies of the shape of three quarter of a sphere is made possible by arranging on the chromium-nickel-steel conveyer belts or directly on a rubber band consisting of silicone rubber, polyurethane, or the like plastic material, hemispheric cups or cups of the size of three quarter of a sphere which have a diameter of at least 20 mm. and up to 30 mm. to 35 mm. After washing and shrinking, the gel produced in such cups has the form of hemispheres or three quarter spheres of a diameter which is about 20% smaller and, after drying, their diameter is about 80% smaller, i.e. the resulting gel bodies have a diameter of about 5 mm. to about 12 mm. When producing the shrunken spheres, they are removed from the cups by the carrier belt with the filled cups turning around the guide pulleys. Preferably projections are provided on the guide pulleys when using rubber conveyer belts. Said projections cause a certain splaying of the upper edges of the cups and thus facilitate considerably discharging of the sphere-like particles.

Spherical gels can be produced by assigning to each conveyer belt of the multiple conveyer belt dryer a covering belt which is laterally somewhat staggered with respect to its component conveyer belt. The conveyer belt has arranged at its upper surface hemispherical recesses which are open on top while the covering belt has such hemispherical recesses or cups at its lower surface which are open at their bottom. The recesses or cups have a diameter of about 22 mm. to about 25 mm. The conveyer belts are made of rubber or rigid or semi-rigid polyethylene or similar plastic material, for instance, of elastomers which are not attacked by water or acids. Both the conveyer belt and the covering belt are caused to move in such a manner that the openings of the recesses or cups arranged in troughs formed by side walls and transverse bars on both belts, are placed upon each other so that the hollow space of two superposed recesses or cups forms a spherical hollow space. The conveyer belt is provided with lateral guiding bars or walls so as to keep the sol in the trough formed by said walls. Said guiding bars or walls serve also for guiding the covering and the conveyer belt. The recesses or cups of the covering belt have at their top small holes to permit escaping of the air so as to enable complete filling of the spherical hollow spaces. Preferably the sol is continuously supplied to the troughs formed by the side walls of the belts. If necessary, the conveyer belt is carried by carrier belts which absorb the tensile stress as well as the expansion strain.

Rapid gelling combined with preliminary drying in the conveyer drier is carried out at a temperature between 50° C. and 70° C. preferably in such a manner that syneresis sets in at the end of the conveyer belt. On separating the conveyer belt and the covering belt at the place where the belts turn around the guide pulleys, the resulting spheres of silica gel drop automatically into water filled troughs which are arranged at the end of the drier. The spherical bodies of gel are then floated from said water filled troughs to the subsequent washing and drying apparatus.

The spherical gel bodies shaped in this manner do not have the structure of gel granules. The spheres have a number of advantages over heretofore known so-called spherical gels. They are more like the molecular sieves since they permit to obtain dew points of −80° C. Their adsorption isotherms are about 10% more favorable than those of normal silica gels. They also possess higher rated adsorption temperatures and lower rated desorption temperatures.

Thus the following measures must be taken in order to produce a silica gel with pores of extremely large diameter which is able to adsorb water up to 80% of their weight at temperatures of +20° C. to below 0° C. while adsorption starts at a temperature of 30° C., and which has a desorption effectiveness of 95% to 98% at 50° C. to 55° C. already.

(1) The starting reactants have a very high sol concentration as it is achieved by a high concentration of the sodium silicate and a high acid concentration. Amounts of 1% to 5% of sodium sulfate when using sulfuric acid for precipitation, or of the same amounts of sodium chloride when precipitation is effected with hydrochloric acid, are preferably added.

(2) The washing step is carried out at a pH-value between about 7.0 and about 11.0.

(3) The temperature of the wash water should not be lower than 15° C. and should increase to 50° C.

(4) The gel is dried by a multi-step process of drying thick layers of the gel of a thickness up to 1.5 m. starting at a temperature not exceeding 60° C. and at a relative air humidity of at least 80% to 90%. The principle of counter current battery systems is preferably applied to the drying process.

(5) Gelling is preferably accelerated by simultaneous pre-drying whereby the syneresis is increased. Said simultaneous gelling and pre-drying should be carried out to a water content of the gel of about 15%.

(6) By the addition of iron, magnesium, and/or aluminum salts to the wash water, the water adsorption capacity can even be further increased. Such additions must, of course, be avoided when producing gels with pores of a small diameter.

As stated hereinabove, the known process and apparatus of producing spherical gels is replaced according to the present invention by an almost completely continuous process of producing ideal spheres of a diameter of 5 mm. to 15 mm. and preferably of a diameter of 8 mm. to 12 mm. This novel process of producing spherical gel bodies is carried out by passing a lower and an upper conveyer belt each having semispherical cups or recesses of a diameter of 15 mm. to 28 mm., depending upon the desired diameter of the spheres of the dry gel, parallel to each other over pulleys or rollers and separating the superposed belts from each other. Belts of any desired length and width, for instance, of a length of 20 m. to 100 m. and a width of 1 m. to 4 m. can be used. In order to be able to fill and to remove the spheres therefrom, the upper and lower guide pulleys are arranged in a somewhat staggered manner. Lateral side walls and transverse strips are arranged at some distance from each other. Their height amounts to a few millimeters and exceeds the size of the spheres by a few millimeters and in an exactly closing off manner. As stated above, the upper hemispherical recesses or cups have small holes to enable air to escape and thus to permit complete filling of the spheres. The lateral walls and the transverse walls prevent the sol from running out from the belts and permit exact sealing of the hollow spaces formed by the superposed cups or recesses.

The belts travel in a housing similar to a single or multi-conveyer belt drier and can also be constructed and operated as such driers in the form of a single belt or several belts. The belts are supported by sliding or following rollers which have gliding rails of the same material. Said rails serve at the same time as re-inforcing means. The preferred material for the conveyer belts from the standpoint of non-stickiness or non-adherence of the moist gel as well as from the standpoint of corrosion resistance and strength is polypropylene or polyethylene of low viscosity. Said materials have also satisfactory elasticity. They can be constructed with or without reinforcements of steel wire or glass fiber wire. The supporting belts, if used, can be made of other materials.

Heating and accelerated gelling can be effected by the action of radiant heat, especially by means of warm air of about 50° C. to about 70° C. which is passed through the gelling container and drier. Gelling including syneresis is completed within 30 minutes to 50 minutes. The spherical particles are released from the cups or recesses in the belts and are dropped into a water bath. They are then floated through a trough into the washing and drying apparatus. In this manner the freshly prepared gel spheres are produced in the most simple and effective manner.

The belts can be driven continuously or discontinuously. A belt, for instance, of about 20 m. length, adjusted to run at a high speed, can be filled within 5 to 10 minutes.

BRIEF DESCRIPTION OF THE DRAWINGS

The objects of the present invention and other objects, advantages, and uses of the present invention will become more apparent from the preceding description and the claims taken in connection with the appended drawings, in which

DESCRIPTION OF THE PREFERRED EMBODIMENTS

Figure 1:
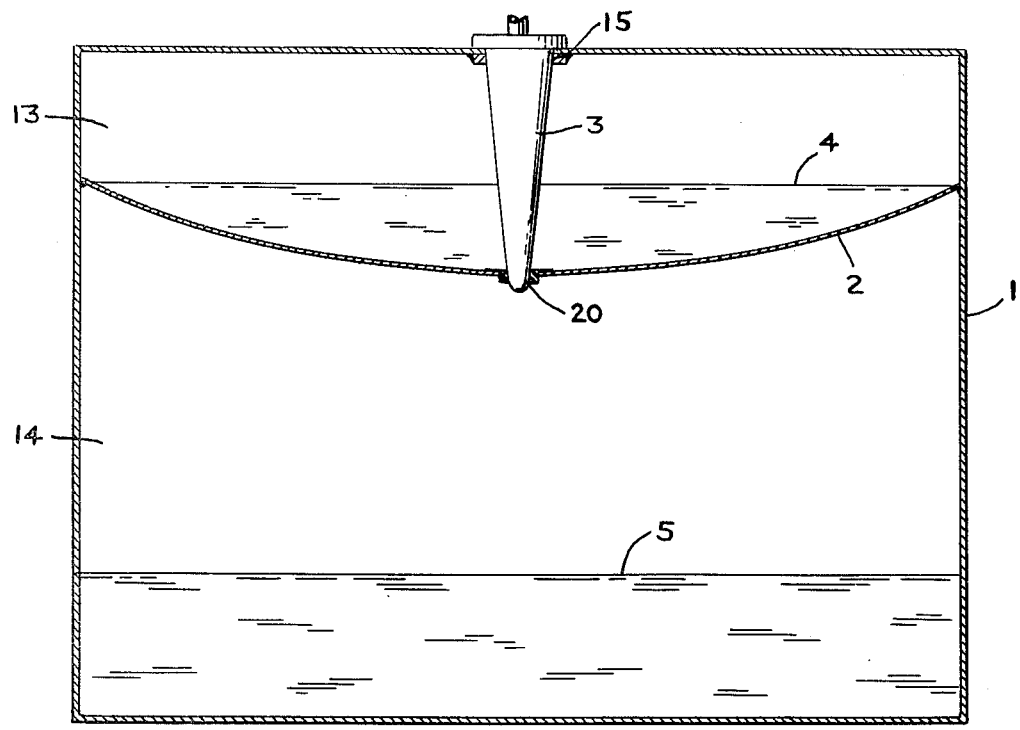
FIG. 1 illustrates in cross-sectional view a vessel provided with an intermediate bottom subdivided by said intermediate bottom into two compartments, said vessel having in its upper compartment a tubular valve and a centered opening in said intermediate bottom as described hereinabove.

Referring now to FIG. 1, the reaction vessel 1 for carrying out the process of producing a silica gel according to the present invention as described hereinabove is subdivided by the intermediate bottom 2 into two compartments 13 and 14 which are separated from each other by said intermediate bottom. An opening 15 and a correlated opening 20 are provided in the upper wall of the reaction vessel 1 and in the intermediate bottom 2. These openings are closed by tubular valve 3 which is disposed in the upper compartment 13 of reaction vessel 1. When the reaction vessel 1 is used as the gelling, washing, and drying vessel, the sol 4 is in the upper compartment 13 while the gel 5 is in the lower compartment 14. When the reaction vessel is used as the washing and drying vessel, the gel is fed into the upper compartment 13 wherein it is washed, and is then drained into the lower compartment 14, wherein it is dried.

Figure 2:
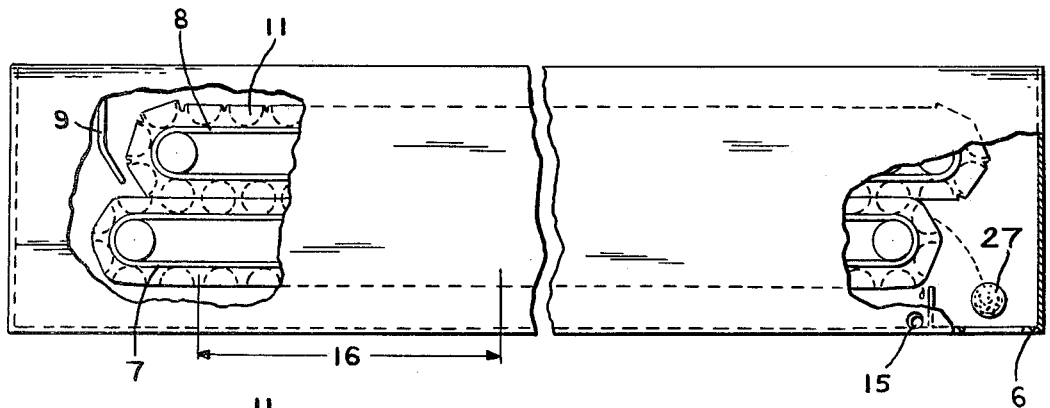
FIG. 2 illustrates in cross-sectional view a gelling apparatus useful in producing spherical gel bodies with two superposed conveyer and covering belts provided with cups or recesses, the semispherical cups or recesses in the lower conveyer belt being open at their top, the semispherical cups or recesses on the covering belt being open at their bottom, said gelling apparatus being as described hereinabove.
Figure 3:
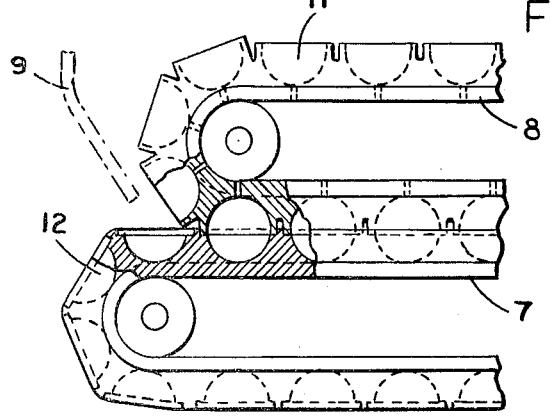
FIG. 3 illustrates in cross-sectional view part of the two belts of FIG. 2 showing the cups or recesses arranged thereon, said two belts being at a distance from each other and the trough provided at the lower belt filled with the sol.
Figure 4:
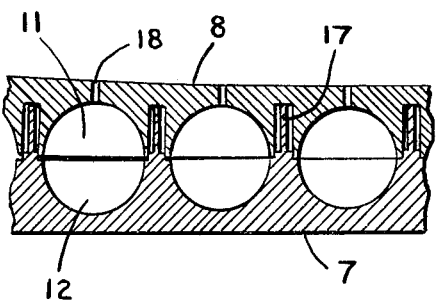
FIG. 4 illustrates in cross-sectional view the parts of the belts as shown in FIG. 3 but in superposed position so that the semi-spherical cups or recesses of both belts form and enclose a sphere.

FIGS. 2 to 4 illustrate the apparatus for producing the silica gel according to the present invention in continuous operation. In said FIGS. 2 to 4, the gelling apparatus 6 comprises conveyor belt 7 and covering belt 8 arranged above conveyor belt 7. Belts 7 and 8 are provided with hemispherically shaped recesses or cups 11 and 12 which are arranged in such a manner that, when the belts are in operation, each recess or cup 11 with its opening at the bottom and the respective recess or cup 12 with its opening at the top define a spherical hollow space to which the sol is fed by inlet pipe 9. Each recess or cup 11 of the covering belt 8 has one or more vent holes 18 provided in its wall to permit escaping of the air so as to enable the sol to enter the space defined by said recess or cup 11. As shown in FIG. 4, conveyor belt 7 is provided with intermediate walls 17 which permit complete filling of the spherical hollow spaces defined by the recesses or cups 11 and 12 placed upon each other.

Water overflowing from conveyor belts 7 and 8 is discharged through opening 15 as shown in FIG. 2.

Hot air, preferably of a temperature between 50° C. and 70° C., is fed into the space 16, thus combining the gelling process with a predrying step. The resulting gel spheres 27 are discharged from the gelling apparatus 6 into a drier.

We claim:

1. In a process of producing silica gel, including the steps of precipitating a silicic acid-containing starting materials and acid reactant to first form an unstable silicic acid containing sol as an intermediate product, subsequently gelling the sol, washing the gel to remove the salts, and drying the gel, the improvements which comprise carrying out the precipitation process in two steps, wherein in the first step a first silicic acid-containing starting material with a silicon dioxide content between about 20% and about 32% by weight is introduced in such a fine distribution and at such a high discharge velocity into the acid reactant, while being subjected to high speed agitation, until a pH-value of the acid reactant between about 1.5 and about 1.8 is attained, that instantaneous reaction between the acid and the silicic acid containing starting material takes place without any precipitation of silicic acid, and wherein in the second precipitation step a second silicic acid-containing starting material having a silicon dioxide content between about 8% and about 14% by weight is introduced into the acid reactant until a pH-value of between about 2.6 and about 3.5 is attained, thereby producing a sol having a silicon dixoide content of about 14% to about 18% by weight, and carrying out the washing step by washing with a washing liquid of a pH between about 1.8 and about 12.0.

2. The process according to claim 1, in which the gelling step subsequent to the precipitation step includes the steps of simultaneous preliminary drying and gelling by conducting the sol in a thin layer through a conveyer belt drier.

3. The process according to claim 2, in which the belt of the conveyer belt drier comprises a plurality of mold elements for pre-shaping the gel into individual units of predetermined shape.

4. The process according to claim 3, in which a covering belt is assigned to said conveyer belt and both belts comprise elastic rubber or elastic plastic material, each conveyer belt having on its upper surface hemispherical recesses which are open at the top and each covering belt having hemispherical recesses at its lower surface which are open at the bottom, said recesses being of a diameter between about 15 mm. and about 28 mm.

5. The process according to claim 4, wherein said diameter is between about 22 mm and about 25 mm.

6. The process according to claim 2, in which the conveyer belt drier comprises lateral walls and transversely arranged ribs of plastic material, the conveyer belt of said conveyer belt drier comprising a chromium-nickel-steel belt, and wherein said washing and drying steps are carried out in a container, said container having an intermediate bottom with a bottom valve and being subdivided by said intermediate bottom into two container compartments, the upper compartment serving as washing container and the lower compartment as drier.

7. The process according to claim 1, wherein sai gelling step comprises gelling said sol in a plurality of hollow mold elements to form individual gel units of predetermined shape.

8. The process according to claim 7, wherein the shape of the mold elements is at least partly spherical.

9. The process according to claim 8, wherein the shape of the mold elements is spherical.

10. The process according to claim 8, wherein the shape of the mold elements is at least semi-spherical.

11. The process according to claim 1, wherein the acid reactant comprises sulfuric acid or hydrochloric acid.

12. The process according to claim 11, wherein the acid reactant comprises sulfuric acid containing between about 1% and about 5% sodium sulfate.

13. The process according to claim 11, wherein the acid reactant comprises hydrochloric acid containing between about 1% and about 5% sodium chloride.

14. The process of claim 1, wherein said steps of gelling and washing are carried out in a container having an intermediate bottom with a bottom valve, said container thus being subdivided into two container compartments, the upper compartment serving as gelling container while the lower compartment is constructed as washing and drying container.

15. The process according to claim 14, wherein said water glass solution is produced by reacting quartz sand with an at least 50% sodium hydroxide solution at a temperature between about 130° C. and about 180° C. and under a pressure between about 4 atm.gauge and about 12 atm.gauge.

16. The process according to claim 1, in which precipitation is effected batchwise in a precipitation container and further comprising maintaining the temperature of the reactants in the container below 20° C.

17. The process according to claim 16, wherein said cooling step comprises circulating the mixture of reactants through a cooling device.

18. The process of claim 1, in which the silicic acid containing starting material used for precipitation comprises a water glass solution having a ratio of sodium oxide to silicon dioxide between about 1.0:3.5 and about 1.0:5.0.

19. The process according to claim 1, wherein precipitation in the second precipitation step is continued only until the solution has attained a pH of about 3.0, and further comprising conducting a third precipitation step wherein there is introduced into the acid reactant a third silicic acid-containing starting material having a silicon dioxide content between about 5% and about 8% by weight.

20. The process according to claim 1, wherein precipitation is effected continuously in troughs arranged one after the other, in which the mixture of acid and silicic acid-containing starting materials during a first precipitation step remains in a first trough not longer than about 3 minutes and in the second precipitation step in a second trough for not more than about 2 minutes.

21. The process according to claim 1, in which removal of the salts by washing the gel is carried out with a washing liquid at an initial temperature of 15° C. which temperature is successively increased to a temperature of 50° C.

22. The process according to claim 1, wherein the first silicic acid-containing starting material is injected below the surface of the acid reactant.

23. The process according to claim 1, wherein the silicic acid-containing starting material is in each case a water glass solution.

24. The process according to claim 1, wherein the first silica acid-containing starting material contains about 32% by weight silicon dioxide and the acid reactant comprises a sulfuric acid solution having a sulfuric acid content of from about 10% to 12%.

25. The process according to claim 1, wherein the temperature of the acid reactant is maintained at a temperature below 20° C. during the precipitation step.

26. The process according to claim 1, wherein the washing step is carried out with a washing liquid having a pH between about 1.8 and 2.5.

27. The process according to claim 1, wherein the washing step is carried out with a washing liquid having a pH between about 2.5 and 3.5.

28. The process according to claim 1, wherein the washing step is carried out with a washing liquid having a pH between about 5 and 6.

29. The process according to claim 1, wherein the washing step is carried out with a washing liquid having a pH between about 7 and 8.

30. The process according to claim 1, wherein the washing step is carried out with a washing liquid having a pH between about 8 and 10.

31. The process according to claim 1, wherein the washing step is carried out with a washing liquid having a pH between about 10 and 12.

32. A process for producing silica gel, comprising the steps of:

introducing a first water glass solution into an acid reactant in such a finely divided distribution and at such a velocity that instantaneous reaction between the water glass and acid takes place without any precipitation of silicic acid under agitation conditions of said acid reactant, said first water glass solution having a molar ratio of sodium oxide to silicon dioxide between about 1:3.5 and 1:5 and a silicon dioxide content of between about 20% and about 32% by weight, said introduction being continued until a pH value of the acid reactant between about 1.5 and about 1.8 is attained, the temperature of the acid reactant being maintained at a temperature less than about 20° C. during said introduction;

after reaching the aforesaid pH value, introducing into said acid reactant a second water glass solution having a molar ratio of sodium oxide to silicon dioxide between about 1:3.5 and 1:5 and a silicon dioxide content of between about 8% and about 14% by weight until a pH value of the acid reactant between about 2.6 and about 3.5 is attained, whereby there is produced a sol having a silicon dioxide content of from about 14% to about 18% by weight;

simultaneously gelling and pre-drying the sol;

washing the pre-dried gel with a wash liquid having a pH value of between about 1.8 and about 12; and drying the washed gel with an atmosphere having a relative humidity of at least from about 80% to 90%.

33. The process according to claim 32, wherein said simultaneous gelling and predrying step is carried out at a temperature of from about 50° C. to about 70° C.

34. The process according to claim 33, wherein said simultaneous gelling and predrying step is carried out until a water content of the gel of about 15% is attained.

35. The process according to claim 34, wherein said simultaneous gelling and predrying step is carried out by arranging the sol in layers of from about 500 mm to 1500 mm in thickness.

36. The process according to claim 35, wherein said drying step is carried out in a first stage with air at a temperature not initially exceeding about 60° C. and during the course of the first stage not exceeding about 80° C.

37. The process according to claim 36, wherein said drying step further comprises a second stage wherein air having a temperature between about 120° C. and 140° C. is employed.

38. The process according to claim 37, wherein in said washing step the wash liquid has a pH value of between about 7 and 11 and the temperature of the wash liquid is initially at least about 15° C. and is increased to a temperature of about 50° C.

39. Silica gel having a silicon dioxide content of between about 16% and about 24%, a pore diameter of between about 20 and about 25 Angstroem, a wetting heat of between about 32 and about 35 cal./g., a bulk weight between about 720 and about 770 g./cm.$^3$, an adsorption temperature of up to about 100° C. and a desorption temperature of between about 150° C. and about 200° C.

40. The silica gel of claim 39, said gel being produced by the process of claim 26.

41. Silica gel having a silicon dioxide content between about 16% and about 24%, a pore diameter of between about 25 and 30 Angstroem, a wetting heat of between about 26 and about 30 cal./g., a bulk weight between about 680 and about 720 g./cm.$^3$, an adsorption temperature of up to about 80° and a desorption temperature of between about 120° C. and about 150° C.

42. The silica gel of claim 41, said gel being produced by the process of claim 26.

43. Silica gel having a silicon dioxide content between about 16% and about 24%, a pore diameter of between about 30 and about 40 Angstroem, a wetting heat of between about 18 and about 22 cal./g., a bulk weight between about 560 and about 680 g./cm.$^3$, an adsorption temperature of up to about 60° and a desorption temperature of between about 80° C. and about 100° C.

44. The silica gel of claim 43, said gel being produced by the process of claim 28.

45. Silical gel having a silicon dioxide content between about 16% and about 24%, a pore diameter of between about 40 and about 50 Angstroem, a wetting heat of between about 15 and about 18 cal./g., a bulk weight between about 460 and about 520 g./cm.$^3$, an adsorption temperature of up to about 40° and a desorption temperature of between about 50° C. and about 70° C.

46. The silica gel of claim 45, said gel being produced by the process of claim 29.

47. Silica gel having a silicon dioxide content between about 16% and about 24%, a pore diameter of between about 50 and about 60 Angstroem, a wetting heat of between about 12 and about 15 cal./g., a bulk weight between about 300 and about 460 g./cm.$^3$, an adsorption temperature of up to about 30° and a desorption temperature of between about 40° C. and about 60° C.

48. The silica gel of claim 47, said gel being produced by the process of claim 30.

49. Silica gel having a silicon dioxide content between about 16% and about 24%, a pore diameter of between about 60 and about 70 Angstroem, a wetting heat of between about 10 and about 12 cal./g., a bulk weight between about 250 and about 350 g./cm.$^3$, an adsorption temperature of up to about 20° and a desorption temperature of between about 30° C. and about 50° C.

50. The silica gel of claim 49, said gel being produced by the process of claim 31.

51. The silica gel of claim 49, further characterized by the ability to adsorb up to 80% of its weight of water at a temperature between about 0° C. and about 20° C. and by a desorption effectiveness of from about 95% to about 98% at a temperature between about 50° C. and about 55° C.

* * * * *